United States Patent Office 3,553,322
Patented Jan. 5, 1971

3,553,322
HELMINTH CONTROL
Duane K. Hass, Juan G. Morales, and Richard R. Whetstone, Modesto, Calif., assignors to Shell Oil Company, New York, N.Y., a corporation of Delaware
No Drawing. Filed July 21, 1967, Ser. No. 654,985
Int. Cl. A01n *9/36;* A61k *27/00*
U.S. Cl. 424—219          7 Claims

ABSTRACT OF THE DISCLOSURE

Internal helminth parasites of warm-blooded animals are controlled by certain methyl ($C_4$–$C_{12}$-alkyl) beta-chlorine-substituted vinyl phosphates.

BACKGROUND OF THE INVENTION

Field of the invention

This invention relates to the control of internal helminth parasites of warm-blooded animals, by employing as an anthelmintic one or more of certain methyl ($C_4$–$C_{12}$-alkyl) beta-chlorine-substituted vinyl phosphates.

Description of the prior art

Dialkyl beta-chlorine-substituted vinyl phosphates are a known class of insecticides (U.S. Pats. 2,956,073; 3,116,201; U.S. Pat. 3,299,190 covering a particular subclass) that also are known to be useful as anthelmintics (U.S. Pats. 3,166,472; 3,318,769; Canadian Pat. 731,113). However, as is pointed out in these latter patents, the phosphates of this class are quite toxic to warm-blooded animals, and their safety factor (ratio of maximum dose tolerated by the host animal to the dose effective to control the parasites) is not as large as could be desired, and according to these patents, safe use of these compounds as anthelmintics requires that they be formulated in a thermoplastic resin which so controls the rate at which the compound is released in the host animal that the parasites are killed without harm to the animal. Further, these anthelmintics as a class have been found to exhibit relatively low activity with respect to tapeworms.

SUMMARY OF THE INVENTION

It now has been found that the group consisting of certain dialkyl beta-chlorine-substituted vinyl phosphates, in which one alkyl moiety is methyl and the other is one of certain $C_4$–$C_{12}$-alkyl moieties, are markedly superior anthelmintics compared to other members of the general class. The member of this group are highly active anthelmintics, with respect to one or more species of helminths, yet are relatively nontoxic to warm-blooded animals. Not only are they intrinsically safer, but they exhibit very large safety factors. The magnitude of the safety factors of these compounds is evident from the fact that these compounds can be safely administered to animals by persons without special training, and without exercising more than ordinary care, and without the necessity for special formulation. While the members of the group containing from ten to twelve carbon atoms are less active with respect to roundworms and pinworms, these higher members, and also the member containing nine carbon atoms, are characterized by substantial activity with respect to tapeworms.

DESCRIPTION OF THE PREFERRED EMBODIMENTS

The anthelmintics of this invention can be described by the general formula:

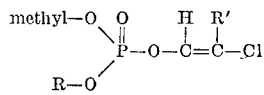

wherein R' represents hydrogen or chlorine and R represents isobutyl or straight-chain alkyl—that is, n-alkyl—containing from six to twelve carbon atoms.

Judging by the available experimental data, it appears that the subgroup wherein R' is chlorine is preferable, as having generally the highest safety factors.

Within this subgroup, two further subgroups appear of particular interest:

(a) That wherein the alkyl moiety contains an odd number of carbon atoms, up to nine. The compounds of this subgroup appear to have the highest safety factors, with the species in which the alkyl moiety is n-heptyl apparently having the highest safety factor of all.

(b) That in which the alkyl moiety contains from ten to twelve carbon atoms. The compounds of this subgroup exhibit substantial activity with respect to tapeworms. In this respect, the species in which the alkyl moiety is n-nonyl also exhibits substantial activity against tapeworms. The most active with respect to tapeworms is the species wherein the alkyl moiety is undecyl.

The activity of the compounds of this invention with respect to helminth-parasites of warm-blooded animals, and their relatively low toxicity with respect to the host animal—that is, their high safety factors—was demonstrated by the following tests:

MAMMALIAN TOXICITY

This is defined as the maximum tolerated dosage, milligrams of test compound per kilogram of animal body weight, and was determined as follows: by intubation a group of mice was treated with a dosage of 500 milligrams of test compound per kilogram of mouse body weight. If any of the mice died, further groups of mice were treated with successively smaller dosages of the test compound, until a dosage was found that all of the mice survived. This is recorded as the maximum tolerated dose.

ANTHELMINTIC ACTIVITY

This is reported as the minimum effective dosage, milligrams of test compound per kilogram of animal body weight, to effect a certain standard of clearance of parasites from the host animal. It was determined in any given case as follows: A group of 5 mice, parasitized by tapeworm (*Hymenolepis nana*) and pinworm (*Syphacia obvelata*), was treated, by intubation with a single dose of the test compound, the dosage being near but less than the maximum tolerated dose. The treated mice were kept from feed and water for 24 hours following treatment, then the mice were sacrificed and the intestinal tract examined for the presence of parasites. If 60% or more of the mice were completely cleared of one and/or the other of the species of parasites, the test was replicated and if the results were confirmed, additional groups of parasitized mice were treated with successively lower dosages of the test compound, to ascertain the minimum dosage required to clear 60% or more of the mice completely of one and/or the other of the two species of parasites.

SAFETY FACTOR

This is expressed as the ratio of the maximum tolerated dose (M.T.D.) to the minimum effective dose (M.E.D.).

Compounds of the invention were evaluated according to this procedure, as were other members of the class disclosed in the prior art. The results were as follows:

endoparasites of mammals and birds, generally, and more particularly, in controlling endoparasites in livestock, such as cattle, swine, sheep and goats, in domestic pets, such as dogs and cats, in rabbits, in poultry such as chickens, turkeys, ducks, geese and the like, and in fur-bearing animals, such as mink, foxes, chinchilla, and the like.

The anthelmintics can be used to eradicate parasites already present, and/or they can be used prophylactically—that is, they can be used to cure an already present worm infestation, and can be used to prevent infestation.

| Compound | M.T.D. (mg./kg.) | M.E.D. (mg./kg.) Tape-worm | M.E.D. (mg./kg.) Pin-worm | Safety factor Tape-worm | Safety factor Pin-worm |
|---|---|---|---|---|---|
| Methyl isobutyl 2,2-dichlorovinyl phosphate | 250 | 16 | 2 | 15 | 125 |
| Methyl pentyl 2,2-dichlorovinyl phosphate | 62 | 31 | 2 | 2 | 31 |
| Methyl hexyl 2,2-dichlorovinyl phosphate | 250 | 31 | 4 | 8 | 75 |
| Methyl heptyl 2,2-dichlorovinyl phosphate | >500 | 125 | 4 | >4 | >125 |
| Methyl octyl 2,2-dichlorovinyl phosphate | >500 | 250 | 31 | >2 | >16 |
| Methyl nonyl 2,2-dichlorovinyl phosphate | >500 | 125 | 16 | >4 | >31 |
| Methyl decyl 2,2-dichlorovinyl phosphate | >500 | 62 | 500 | >8 | 1 |
| Methyl undecyl 2,2-dichlorovinyl phosphate | >500 | 31 | 500 | >16 | 1 |
| Methyl dodecyl 2,2-dichlorovinyl phosphate | >500 | 125 | 500 | >4 | 1 |
| Dimethyl 2,2-dichlorovinyl phosphate | 62 | 62 | 31 | 1 | 2 |
| Methyl ethyl 2,2-dichlorovinyl phosphate | 16 | 16 | 16 | 1 | 1 |
| Methyl propyl 2,2-dichlorovinyl phosphate | 125 | 16 | 8 | 7 | 16 |
| Methyl isopropyl 2,2-dichlorovinyl phosphate | 16 | 16 | 16 | 1 | 1 |
| Methyl butyl 2,2-dichlorovinyl phosphate | 31 | 31 | 2 | 1 | 16 |
| Methyl sec-butyl 2,2-dichlorovinyl phosphate | 31 | 31 | 1 | 1 | 31 |
| Methyl isopentyl 2,2-dichlorovinyl phosphate | 31 | 16 | 2 | 2 | 16 |
| Methyl sec-octyl 2,2-dichlorovinyl phosphate | 125 | 125 | 31 | 1 | 4 |
| Diethyl 2,2-dichlorovinyl phosphate | 31 | 16 | 2 | 2 | 16 |
| Dipropyl 2,2-dichlorovinyl phosphate | 125 | 16 | 2 | 7 | 63 |
| Dibutyl 2,2-dichlorovinyl phosphate | 62 | 4 | 2 | 15 | 31 |
| Dipentyl 2,2-dichlorovinyl phosphate | 62 | 62 | 2 | 1 | 16 |
| Dihexyl 2,2-dichlorovinyl phosphate | 250 | 250 | 250 | 1 | 1 |
| Didecyl 2,2-dichlorovinyl phosphate | >500 | 500 | 500 | 1 | 1 |
| Dimethyl 2-chlorovinyl phosphate | 62 | 62 | 62 | 1 | 1 |
| Methyl ethyl 2-chlorovinyl phosphate | 2 | 2 | 1 | 1 | 2 |
| Diethyl 2-chlorovinyl phosphate | 16 | 16 | 16 | 1 | 1 |
| Diisopropyl 2-chlorovinyl phosphate | 62 | 62 | 62 | 1 | 1 |

From the results of these tests, it is clearly evident that the compounds of the invention, while having high anthelmintic activity, have much lower mammalian toxicity, thus having much higher safety factors as well as higher intrinsic safety.

The compounds of this invention are employed as anthelmintics by the conventional means and techniques employed in the anthelmintic art. The manner in which these compounds are prepared is described in detail in copending application Ser. No. 654,993, which is drawn to the preparation of these compounds as anthelmintics.

The anthelmintics of this invention wherein the alkyl moiety contains from four to nine carbon atoms can be used to control a wide spectrum of endoparasitic roundworms, pinworms, whipworms, hookworms, threadworms, cecal worms, stomach worms, hairworms, threadnecked worms, cooperias, and the like. Some may act topically, some may act systemically, and thus can control such endoparasites as the larvae of heel flies, bomb flies, bot flies and the like. Thus, these anthelmintics can be used to control species of endoparasites of the genera: Haemonchus, Trichostrongylus, Ostertagia, Cooperia, Trichuria, Oesophagostomum, Strongyloides, Ascaris, Nematodirus, Ancylostoma, Necator, Gasterophilus, Nematospiroides, Syphacia, to name some typical genera.

The anthelmintics of this invention wherein the alkyl moiety contains from nine to twelve carbon atoms can be used to control flatworms (tapeworms) of the Cestoda, such as species of the genera: Hymenolepis, Moniezia, Anoplocephala, Paranocephala, Thysanosoma, Taenia, Multiceps, Echinococcus, Diplyidium, Diphyllobothrium, Mesocestoides, and the like.

It is accordingly evident that the $C_9$ alkyl species provides a very broad spectrum anthelmintic. Moreover, very broad spectrum anthelmintic activity can be provided by combining one of the $C_{4-8}$ alkyl species with one of the $C_{10-12}$ species of these anthelmintics.

These new anthelmintics are effective in controlling

The dosage of the anthelmintic to be used will depend upon the particular kind or kinds of parasites to be controlled, the particular anthelmintic to be used, the kind of host animal, whether the anthelmintic is to be used to cure an already existing infection, or merely as a prophylactic, and the like. These factors are those ordinarily encountered in the treatment of animals to cure and/or prevent their infestation by endoparasites; these factors and their solution all are well known to the practioners of the art. In general, however, larger dosages are required to cure an already existing infestation than are required for prophylaxis. Thus, dosages of the anthelmintic to provide as little as 1 milligram of the anthelmintic per kilogram of the live body weight of the animal fed at regular intervals—twice daily or daily, for example—may be sufficient to prevent infestation of animals by endoparasites. However, prophylactic dosages ordinarily will amount to about 2–10 milligrams of the anthelmintic per kilogram of the animal body weight. The dosage required to eradicate already existing endoparasites ordinarily will be at least about 5 milligrams of the anthelmintic per kilogram of the animal body weight, with usual dosages being about 5 to 50 milligrams on the same basis. The maximum dosage, of course, in every case will be determined by the toxicity of the anthelmintic to the host animal. The anthelmintics of this invention provide an excellent safety factor—effectively eradicating endoparasites without ill effect upon the host animal.

We claim as our invention:

1. A method for controlling tapeworms and pinworms in warm-blooded animals which comprises orally administering to an infested animal a parasiticidally effective dosage of a compound of the formula:

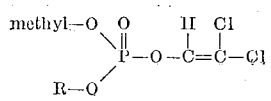

wherein R is isobutyl or straight-chain alkyl of from six to twelve carbon atoms.

2. A method according to claim 1 wherein R contains from six to nine carbon atoms.

3. A method according to claim 1 wherein R contains from nine to twelve carbon atoms.

4. A method according to claim 2 wherein R contains seven carbon atoms.

5. A method according to claim 2 wherein R contains eight carbon atoms.

6. A method according to claim 2 wherein R contains nine carbon atoms.

7. A method according to claim 3 wherein R contains eleven carbon atoms.

References Cited

UNITED STATES PATENTS

| 3,166,472 | 1/1965 | Menn et al. | 424—224X |
| 3,299,190 | 1/1967 | Schrader | 424—219X |
| 3,318,769 | 5/1967 | Folckemer et al. | 424—219X |

FOREIGN PATENTS

| 783,697 | 9/1957 | Great Britain. |
| 689,778 | 5/1967 | Belgium. |

OTHER REFERENCES

Chemical Abstracts, vol. 62, 1965; 10300d.

STANLEY J. FRIEDMAN, Primary Examiner

L. SCHENKMAN, Assistant Examiner